United States Patent
Georgieva et al.

(10) Patent No.: US 12,101,415 B2
(45) Date of Patent: *Sep. 24, 2024

(54) METHOD OF RSA SIGNATURE OR DECRYPTION PROTECTED USING A HOMOMORPHIC ENCRYPTION

(71) Applicant: THALES DIS FRANCE SAS, Meudon (FR)

(72) Inventors: Mariya Georgieva, Meudon (FR); Aline Gouget, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 8 days.

This patent is subject to a terminal disclaimer.

(21) Appl. No.: 17/574,005

(22) Filed: Jan. 12, 2022

(65) Prior Publication Data
US 2022/0141038 A1    May 5, 2022

Related U.S. Application Data

(63) Continuation of application No. 16/467,957, filed as application No. PCT/EP2017/081756 on Dec. 6, 2017, now Pat. No. 11,233,659.

(30) Foreign Application Priority Data

Dec. 8, 2016 (EP) .................... 16203039

(51) Int. Cl.
*H04L 9/32* (2006.01)
*H04L 9/00* (2022.01)
(Continued)

(52) U.S. Cl.
CPC .......... *H04L 9/3249* (2013.01); *H04L 9/008* (2013.01); *H04L 9/085* (2013.01); *H04L 9/302* (2013.01); *H04L 2209/16* (2013.01)

(58) Field of Classification Search
CPC .............. H04L 9/3249; H04L 2209/16; H04L 9/008; H04L 9/085; H04L 9/302
See application file for complete search history.

(56) References Cited

U.S. PATENT DOCUMENTS

| | | | |
|---|---|---|---|
| 2014/0177828 A1* | 6/2014 | Loftus ............... | H04L 9/0852 380/44 |
| 2015/0270965 A1* | 9/2015 | Fischer .............. | H04L 9/0869 380/28 |
| 2016/0043870 A1* | 2/2016 | Avanzi .............. | H04W 12/041 713/176 |

FOREIGN PATENT DOCUMENTS

| | | |
|---|---|---|
| EP | 2728790 A1 | 5/2014 |
| WO | WO0049768 A1 | 8/2000 |

OTHER PUBLICATIONS

O Sri Nagesh: "A Privacy Preserving of Composite Private/Public Key in Cloud Servers", International Journal of Computer Trends and Technology, Mar. 25, 2014, pp. 202-208, XP055376486, DOI: 10.14445/22312803/IJCTT-V9P140 Retrieved from the Internet: URL:http:ijcttjournal.org/Volume9/number-4/IJCTT-V9P140.pdf p. 202-p. 205.

(Continued)

*Primary Examiner* — Daniel B Potratz

(57) ABSTRACT

Decryption of an RSA encrypted message encrypted with a public RSA key by receiving encrypted key share components computed by generating a private RSA key d and a RSA modulus integer N, where N and d are integers; splitting the private key into key shares, encrypting with a fully homomorphic encryption (FHE) algorithm each key share component by using a Fully Homomorphic Encryption secret key ps associated with a set Ss to generate the encrypted key share components of said secure RSA key, computing an intermediate value YS for each set SS from said encrypted key share components, such that said com- (Continued)

puted intermediate value is a part of the RSA decrypted message, under FHE-encrypted form, and decrypting the encrypted message by combining said computed intermediate values for all sets.

9 Claims, 4 Drawing Sheets

(51) Int. Cl.
*H04L 9/08* (2006.01)
*H04L 9/30* (2006.01)

(56) References Cited

OTHER PUBLICATIONS

PCT/EP2017/081756, International Search Report, Feb. 21, 2018, European Patent Office, P.B. 5818 Patentlaan 2 NL—2280 HV Rijswijk.
PCT/EP2017/081756, Written Opinion of the International Searching Authority, Feb. 21, 2018, European Patent Office, P.B. 5818 Patentlaan 2 NL—2280 HV Rijswijk.

* cited by examiner

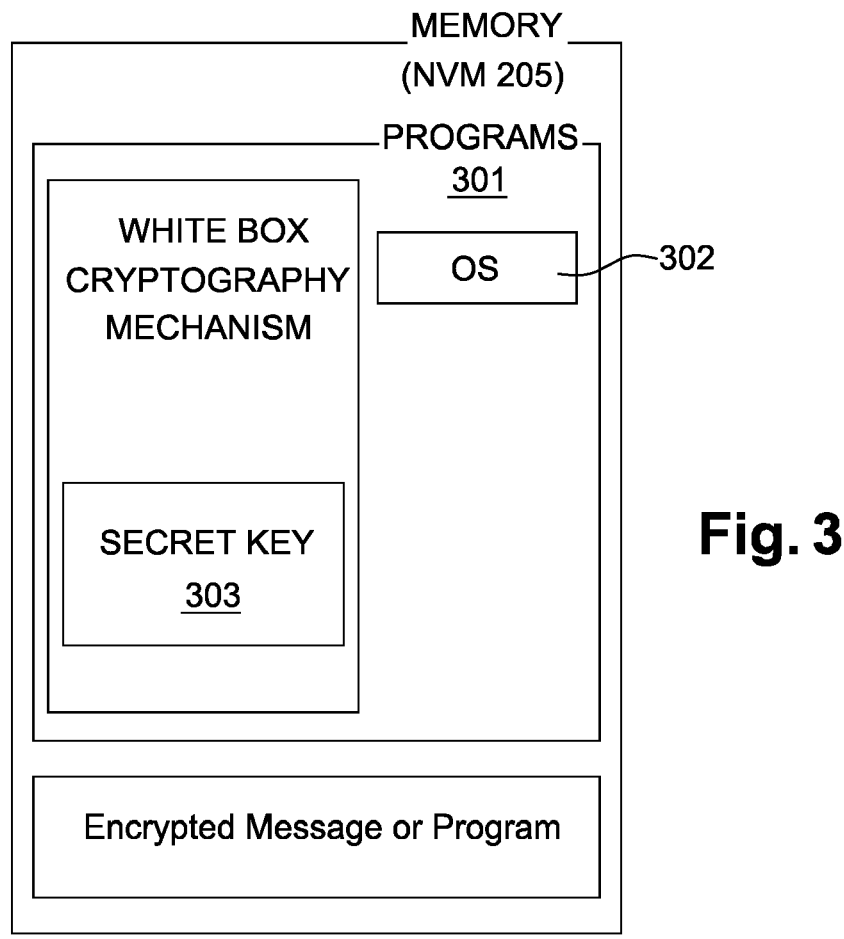
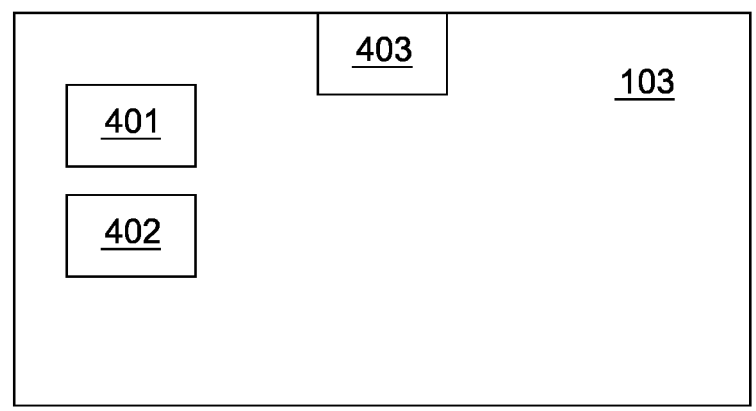

METHOD OF RSA SIGNATURE OR DECRYPTION PROTECTED USING A HOMOMORPHIC ENCRYPTION

CROSS-REFERENCE TO RELATED APPLICATIONS

This application is a continuation of application Ser. No. 16/467,957, filed on 8 Jun. 2019, and which is the National Stage of International Application No. PCT/EP2017/081756, filed 6 Dec. 2017.

FIELD OF THE INVENTION

The present invention relates to the field of software implementation of an RSA signature/decryption in a white-box environment, and of associated cryptographic devices, and more particularly to cryptographic devices allowing to keep cryptographic assets secure even when subject to white-box attacks.

BACKGROUND OF THE INVENTION

A first application of cryptography is to provide mechanisms to protect data, such as messages exchanged on a communication channel, from being accessed by an unauthorized user. A plaintext piece of data may be protected by converting it into a ciphertext that may only be deciphered, i.e., converted back into the original data by someone or some device owning a secret key required for performing the deciphering operation.

Two major categories of cryptography are secret key cryptography and private-key-public-key cryptography (herein, simply referred to as public key cryptography). In public key cryptography, the recipient of a ciphertext message, i.e., the decrypting party, has a private key or secret key required to decipher ciphertext messages encrypted with the public key. In other words, there is an association between a particular private key and a particular public key; they form a key pair. The public key is made available to anyone who wishes to send an encrypted message (a ciphertext message) whereas the corresponding secret key is kept secret by the intended recipient of messages.

Public key cryptography can also be used for authenticating the issuer of a message. Such an issuer can generate a signature based on said message using his private key. The recipient of the message can then use the public key of the alleged issuer for verifying that the signature was generated using the associated private key ie that the issuer of the message is indeed who he claims to be. An example of widely used public key cryptosystem is Rivest-Shamir-Adelson (RSA) cryptosystem. Such a cryptosystem is based on the practical difficulty of factoring the product of two large prime numbers and uses a public key (e, N) and a private key d such that $e \cdot d = 1$ modulo phi(N), with N, d and e integers and phi( ) Euler's totient function. RSA cryptosystem allows publicly sharing the public key (e, N) for producing ciphertexts while enabling that only someone with knowledge of the private key d can decipher such ciphertexts and get knowledge of the private data enciphered in it. The private key can also be used to generate a signature for a message. Such a signature can then be verified by anyone using the associated public key. Of course the private key d must remain secret, otherwise any attacker having knowledge of the secret key could decipher ciphertext ciphered with the public key, and the privacy of enciphered data would not be guaranteed anymore. Such an attacker could also generate forged signatures of a message as if he was the true owner of the private key.

Traditionally, in order to ensure that the secret key remains secret, the decryption or signature algorithm is supposed to be executed in a secure environment only. The device executing such an algorithm is assumed trusted, preventing any attacker trying to decipher a secret message from accessing. This is referred to as black box cryptography.

However, cryptographic processes are more and more deployed in applications executed on open devices. For example many user devices now have access to the Internet, such as PCs, tablets, smartphones, and can be used for playing copyrighted digital content such as audio or video files. Such files may be cryptographically protected, for example using digital rights management (DRM) files, in order to make it available to a user only as long as the user as subscribed to an online multimedia streaming service.

Cryptographic processes are then executed in an environment where not all users or devices can be trusted. Such a context is usually called a white-box attack context. In such a context, cryptosystems sensitive data such as private keys, are vulnerable to attacks since the attacker has full access to the software implementation of the cryptographic processes. Binary code of such processes is completely accessible and editable by the attacker that can analyze the binary code of the cryptography application and, for example, memory pages or registers used for temporary storage during the execution. Such manipulation may, for example, be performed using debuggers and hardware emulation tools.

Software implementations of cryptosystems able to resist white-box attacks have been sought. In such implementations the private key may be provided on the subscriber's cryptography device, e.g., a mobile device such as a mobile telephone, in a manner that it can be used by the device to decrypt or generate a signature without revealing either the key or the algorithm to the subscriber. The key might be hidden in some way inside the code implementing the decryption/signature algorithm and the algorithm may be obfuscated so that it is very difficult to determine where the key is hidden. The key's value might be also protected so that it is very difficult to determine it. This is referred to as white-box cryptography.

A very powerful cryptography mechanism, known as fully homomorphic encryption (FHE), was introduced by Craig Gentry in 2009 in [Gentry] Fully Homomorphic Encryption Using Ideal Lattices, in Proceedings of the forty-first annual ACM symposium on Theory of computing (STOC '09), pp. 169-178. ACM, 2009. [Gentry] is incorporated herein by reference in its entirety. Broadly, in FHE, calculations may be performed on encrypted values, with results decrypted, to produce results that are the same as if the calculation had been performed on corresponding plaintext values. FHE provides for the application of an arithmetic circuit to a set of ciphertexts and the result is an encrypted value that would be the same as if it had been evaluated on the underlying plaintext. To be considered fully homomorphic, the encryption scheme allows for computations using arbitrary functions and is capable of evaluation of any circuit.

Homomorphic encryption has been considered for use in white-box cryptography. See e.g., (2009) Brecht Wyseur (COSIC) Ph.D. thesis, (2009), http://www.cosic.esat.kuleuven.be/publications/thesis-152.pdf (accessed on Aug. 29, 2016).

However, current performances of FHE schemes applied to RSA cryptosystem are low. Computation time required for performing RSA cryptographic operations using FHE schemes are too high to enable a practical secure implementation of RSA in a white-box environment on existing user devices.

Therefore, there is a need for a software implementation, and an associated cryptographic device, of RSA cryptosystem secured by a FHE scheme in a white-box environment and achieving a computation time enabling practical application.

SUMMARY OF THE INVENTION

For this purpose and according to a first aspect, this invention therefore relates to a method of generating a secure RSA key by a server comprising the steps of:
- generating a private RSA key d and a RSA modulus integer N, where N and d are integers;
- splitting the private key d in J key shares $d_j$ of length n, with $n = \log_2 N$, j in [1, J], J being an integer, and such that $d = d_1 + d_2 + d_J \mod \text{phi}(N)$, where each key share $d_j$ is equal to $(d_j^{(0)} \ldots d_j^{(i)} \ldots d_j^{(n/b-1)})$ with each key share component $d_j^i$ in $\{0 \ldots 2^b - 1\}$ and i in [0, n/b−1], b being an integer inferior to n and phi the Euler's totient function;
- encrypting with a fully homomorphic encryption (FHE) algorithm each key share component $d_j^{(i)}$ of the private RSA key d by using a Fully Homomorphic Encryption secret key $p_S$ associated with a set $S_S$ comprising the index couple (i,j), to generate an encrypted key share component $ed_j^{(i)}$ of said secure RSA key,
- said set $S_S$ being a set of integer couples, among a predetermined integer number u of disjoint sets $\{S_1, S_2, \ldots, S_S, S_{S+1}, \ldots, S_u\}$ generated such that: $U\{S_S\} = \{(i,j) \text{ such that i in } [0, n/b-1], j \text{ in } [1, J]\}$ and each said set among $\{S_1, \ldots S_u\}$ being associated with a Fully Homomorphic Encryption (FHE) secret key.

Such a method enables to generate a RSA private key under a form that can be securely stored on a client device and then securely used for RSA signature generation or for RSA-encrypted message decryption. The RSA private key is indeed split in multiple key share components and such components are FHE-encrypted using multiple secret keys, making it difficult for an attacker to recover the whole RSA private key on the client device, even in a whitebox environment.

In a first embodiment, said FHE secret keys of said sets may be all identical.

It makes it unnecessary for a client device using the encrypted key share components to use sets defined by the server. The client device can then define its own sets while remaining able to perform FHE decryption of FHE encrypted values.

In a second embodiment, $\{S_1, \ldots S_u\}$ comprises at least a first set and a second set such that the FHE secret key associated with the first set is different from the FHE secret key associated with the second set.

Doing so, even if an attacker retrieves the FHE secret key associated with a given set, he won't be able to decrypt all key share components and retrieve the whole RSA private key d.

The fully homomorphic encryption algorithm may be a DGHV (Dijik, Gentry, Halevi, Vaikuntanathan) Scheme such that a ciphertext c for a data m in ZN, FHE encrypted with a FHE secret key p, is equal to $q \cdot p + N \cdot r + m$ where q is a random integer, r is a random integer and N is the RSA modulus such that $|p| > C_S(2 \log N + \log r)$ with $C_S$ the maximum number of elements of any set $S_S$ in $\{S_1, \ldots, S_U\}$, and such that the ciphertext c is deciphered by computing $m = (c \mod p) \mod N$.

Such a FHE scheme enables a practical and efficient implementation of FHE operations described in this document.

According to a second aspect, this invention therefore relates also to a method of secure generation of a RSA signature of a message m by a client device with the secure RSA key generated according to the first aspect, comprising the steps of:
- receiving from the server the generated encrypted key share components $ed_j^{(i)}$ with j in [1, J] and i in [0, n/b−1];
- computing an intermediate value $Y_S$ for each set $S_S$ in $\{S_1, \ldots, S_u\}$ from said encrypted key share components $ed_j^{(i)}$ whose index couple (i,j) is comprised in $S_S$ and from said message m, such that said computed intermediate value is a part of the RSA signature of said message m, under FHE-encrypted form;
- generating the RSA signature of said message m by combining said computed intermediate values for all sets.

Such a method enables the client device to generate a RSA signature of a message without ever disclosing the RSA private key d. Key share components are only handled under FHE-encrypted form, ensuring their security against any attacker.

According to a third aspect, this invention therefore relates also to a method of secure RSA decryption by a client device of an RSA encrypted message c encrypted with a public RSA key forming a key pair with a secure private RSA key generated according to the first aspect, comprising the steps of:
- receiving from the server the generated encrypted key share components $ed_j^{(i)}$ with j in [1, J] and i in [0, n/b−1];
- computing an intermediate value $Y_S$ for each set $S_S$ in $\{S_1, \ldots, S_u\}$ from said encrypted key share components $ed_j^{(i)}$ whose index couple (i,j) is comprised in $S_S$ and from said encrypted message c, such that said computed intermediate value is a part of the RSA decrypted message m, under FHE-encrypted form;
- decrypting the encrypted message c by combining said computed intermediate values for all sets.

Such a method enables the client device to decrypt a RSA encrypted message without ever disclosing the RSA private key d. Key share components are only handled under FHE-encrypted form, ensuring their security against any attacker.

The computation of an intermediate value $Y_S$ for a set $S_S$ in $(S_1, \ldots, S_u)$ of the method of secure generation of an RSA signature of a message m, $h(m)^d \mod N$, according to the second aspect, may comprise:
for all (i,j) in $S_S$, computing $z^{(i)} = h(m)^{(2^{\wedge}b)^{\wedge}i} \mod N$ and computing $$y_j^{(i)} = \sum_{w=0}^{2^b-1} \left( \prod_{v=0, v \neq w}^{2^b-1} (ed_j^{(i)} - v)/(w-v) \right) z^{(i) \wedge w}$$

calculating the product of $y_j^{(i)}$ for all (i,j) in the set $S_S$.

Such operations enable to combine all encrypted key shares associated with each set into an intermediate value suitable for generating an RSA signature without performing a FHE decryption of the key share components, and therefore without disclosing the RSA private key d.

For each w in $[0; 2^{b-1}]$, the value $ed_j^{(i)\wedge w}$, resulting from the encryption with said FHE algorithm of the value of each key share component $d_j^{(i)}$ to the power w $d_j^{(i)\wedge w}$ by using the FHE secret key $p_S$ of said set $S_S$ comprising the index couple (i,j) may be computed and stored by the server, and then transmitted to the client device to compute said intermediate values.

Or for each w in $[0; 2^{b-1}]$, the value $\Pi_{v=0,\ v\neq w}^{2^b-1}(ed_j^{(i)}-v)/(w-v)$ resulting from the encryption with said FHE algorithm of the value of $\Pi_{v=0,\ v\neq w}^{2^b-1}(d_j^{(i)}-v)/(w-v)$ by using the FHE secret key $p_S$ of said set $S_S$ comprising the index couple (i,j), may be computed and stored by the server, and then transmitted to the client device to compute said intermediate values.

Such a precomputation enables to save computation resources on the client device side, and therefore accelerates the generation of an RSA signature by the client device.

The order in which intermediate values $Y_S$ are computed for every sets $S_S$ in $\{S_1, \ldots, S_u\}$ may be random.

It enables the client device to use a different order at each signature generation or message decryption, which makes it more difficult for an attacker to learn information from attacks on multiple signature generation or decryption occurrences and to retrieve the key share components of the RSA private key.

The generation of the RSA signature may comprise:
for each intermediate value $Y_S$ computed for each set $S_S$ in $\{S_1, \ldots, S_u\}$, the decryption of said computed intermediate value $Y_S$ by using the FHE secret key $p_S$ of the set $S_S$,
and the multiplication of said decrypted intermediate values all together.

It enables the client device to easily combine intermediate values.

The generation of the RSA signature may comprise a combination of a first intermediate value $Y_S$ for a first set $S_S$ and a second intermediate value $Y_T$ for a second set $S_T$, with $S_S$ and $S_T$ in $\{S_1, \ldots, S_u\}$, said combination comprising successively:
a. a prior masking of the first intermediate value $Y_S$ with a mask being FHE-encrypted with the FHE secret key $p_S$ of the first set $S_S$,
b. a FHE-decryption, with the FHE secret key $p_S$ of the first set $S_S$, of said masked first intermediate value,
c. a simultaneous unmasking and FHE-encryption, with the FHE secret key $p_T$ of the second set $S_T$, of the decrypted masked first intermediate value,
d. a multiplication of the result of step c. with the second intermediate value $Y_T$.

Such a combination process enables to combine intermediate values while always keeping them under a FHE-encrypted or masked form, despite them being FHE encrypted with different FHE private keys $p_S$. Therefore it increases the security of the method against any attack aiming at retrieving the RSA key share components. It also enable to combine intermediate values.

The generation of the RSA signature may comprise:
a combination of a first intermediate value $Y_S$ FHE-encrypted with a first FHE secret key $p_S$ associated with a first set $S_S$, with a second intermediate value $Y_T$ FHE-encrypted with a second FHE secret key $p_T$ associated with a second set $S_T$, wherein $S_S$ and $S_T$ are the union of one or more sets in $\{S_1, \ldots, S_u\}$,
wherein a random value $k_S$ has been FHE-encrypted with the first FHE secret key $p_S$ to generate a FHE-encrypted mask $ek_S$ for the first set $S_S$,
and wherein the inverse or opposite $invk_S$ of the random value $k_S$ has been FHE encrypted with the second FHE secret key $p_T$ of the second set $S_T$ to generate a FHE-encrypted inverse mask $einvk_S$ for the first set $S_S$,
said combination comprising if the size of the first set $S_S$ is below a predetermined value, performing a key switching between said first set $S_S$ and said second set $S_T$ comprising:
masking the first intermediate value $Y_S$ with said generated mask: $z_S=Y_S*ek_S$ or $z_S=Y_S+ek_S$;
FHE-decrypting said masked first intermediate value $z_S$ with the first FHE secret key $p_S$ to obtain a decrypted masked first intermediate value $m_S$;
simultaneously unmasking and FHE-encrypting with the second FHE secret key $p_T$ the decrypted masked first intermediate value $m_S$ by multiplying or summing up said decrypted masked first intermediate value $m_S$ with said FHE-encrypted inverse mask $einvk_S$ for the first set $S_S$, to obtain a third intermediate value $w_S=m_S*einvk_S$ or $w_S=m_S+einvk_S$;
multiplying the second intermediate value $Y_T$ with the third intermediate value $w_S$ for obtaining a fourth intermediate value $Y_{S'}$ for the set $S_{S'}$ union of sets $S_S$ and $S_T$: $Y_{S'}=Y_T*W_S$;
if the size of the set $S_{S'}$ union of said first set $S_S$ and said second set $S_T$ is superior to said predetermined value, FHE decrypting said fourth intermediate value $Y_{S'}$ with the second FHE secret key $p_T$ of the second set $S_T$;
else performing the previous steps using the fourth intermediate value $Y_{S'}$ as first intermediate value for the union set $S_{S'}$ as first set with the second FHE secret key $p_T$ as first FHE secret key, and using a fifth intermediate value $Y_v$ as second intermediate value for a third set $S_v$ as second set, wherein $S_v$ is the union of one or more sets in $\{S_1, \ldots, S_U\}$ not already included in the union set $S_{S'}$.

It enables combining altogether multiple intermediate values until getting a combination result that can be FHE-decrypted with little enough risk that an attacker could retrieve key share components, i.e. part of the RSA private key, by attacking said combination result under FHE-decrypted form.

When said FHE secret keys of said sets are all identical, the method of secure generation of a RSA signature of a message m by a client device with the secure RSA key generated according to the first aspect, may comprise the steps of:
receiving from the server the generated encrypted key share components $ed_j^{(i)}$ with j in $[1, J]$ and i in $[0, n/b-1]$;
generating a predetermined integer number v of disjoint sets $\{S'_1, S'_2, \ldots, S'_S, S'_{S+1}, \ldots, S'_v\}$ such that: $U\{S'_S\}=\{(i,j)$ such that i in $[0, n/b-1]$, j in $[1, J]\}$ and each said set $S'_S$ among $\{S'_1, \ldots S'_v\}$ being associated with the Fully Homomorphic Encryption (FHE) secret key $p_S$ used by the server to encrypt said key share components.
computing an intermediate value $Y_S$ for each set $S'_S$ in $\{S'_1, \ldots, S'_v\}$ from said encrypted key share components $ed_j^{(i)}$ whose index couple (i,j) is comprised in $S'_S$ and from said message m, such that said computed intermediate value is a part of the RSA signature of said message m, under FHE-encrypted form;

generating the RSA signature of said message m by combining said computed intermediate values for all sets.

Such a RSA signature generation method enables the client device to define its own sets to be used for computing intermediate values, rather than using the sets defined by the server. It enables the client device to redefine new sets at each generation of a new RSA signature, therefore increasing the security level of the method.

The generation of said disjoint sets $\{S'_1, \ldots, S'_\nu\}$ may be performed depending on said message.

It enables the client device to easily define new sets each time an RSA signature is generated for a new message.

According to a fourth aspect, this invention therefore relates also to a computer program product directly loadable into the memory of at least one computer, comprising software code instructions for performing the steps of the methods according to the first, second or third aspect when said product is run on the computer.

According to a fifth aspect, this invention therefore relates also to a server comprising a processor configured to perform the steps of the method according to the first aspect, a memory configured to store said key share components of said secure RSA key and an interface to send said key share components of said secure RSA key.

According to a sixth aspect, this invention therefore relates also to a client device comprising a memory and a processor configured to perform the computing and generating steps of the method according to the second aspect, and an interface to receive said key share components of said secure RSA key.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 3 is a schematic illustration of programs and data stored in a memory of the client device of FIG. 2;

FIG. 4 illustrates schematically a server according to an embodiment of the present invention;

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

In the description below, notations under the form x^y and $x^y$ are both used for the exponentiation operation.

The invention aims at solving the issue of securely implementing an RSA exponentiation with the RSA private key d, for generating a signature or decrypting an RSA-encrypted message, in a white-box environment while ensuring reasonable performances.

For that purpose, the invention provides a cryptographic system implementing such an RSA exponentiation using obfuscation techniques, anti-tampering techniques and a FHE scheme preventing any attacker from recovering the RSA private key d of RSA cryptosystem. Said FHE scheme is used by a remote server to encrypt the private key d, and then by the client device to compute the RSA decryption/signature using the encrypted private key without deciphering it.

In order to achieve an acceptable calculation time without degrading the security level, the bits of the encrypted private key are split in several sets. The generation of a RSA signature or the RSA-decryption of an encrypted message is then based on separate calculations of parts of a signed or deciphered message for each set of bits of the encrypted key, independently of the other sets.

In the following paragraphs, the expressions "FHE" or "homomorphic" used as adjectives are used to qualify data encrypted by an encryption operation of said Fully Homomorphic Encryption scheme or to qualify operations performed on such encrypted data.

Figure 1:
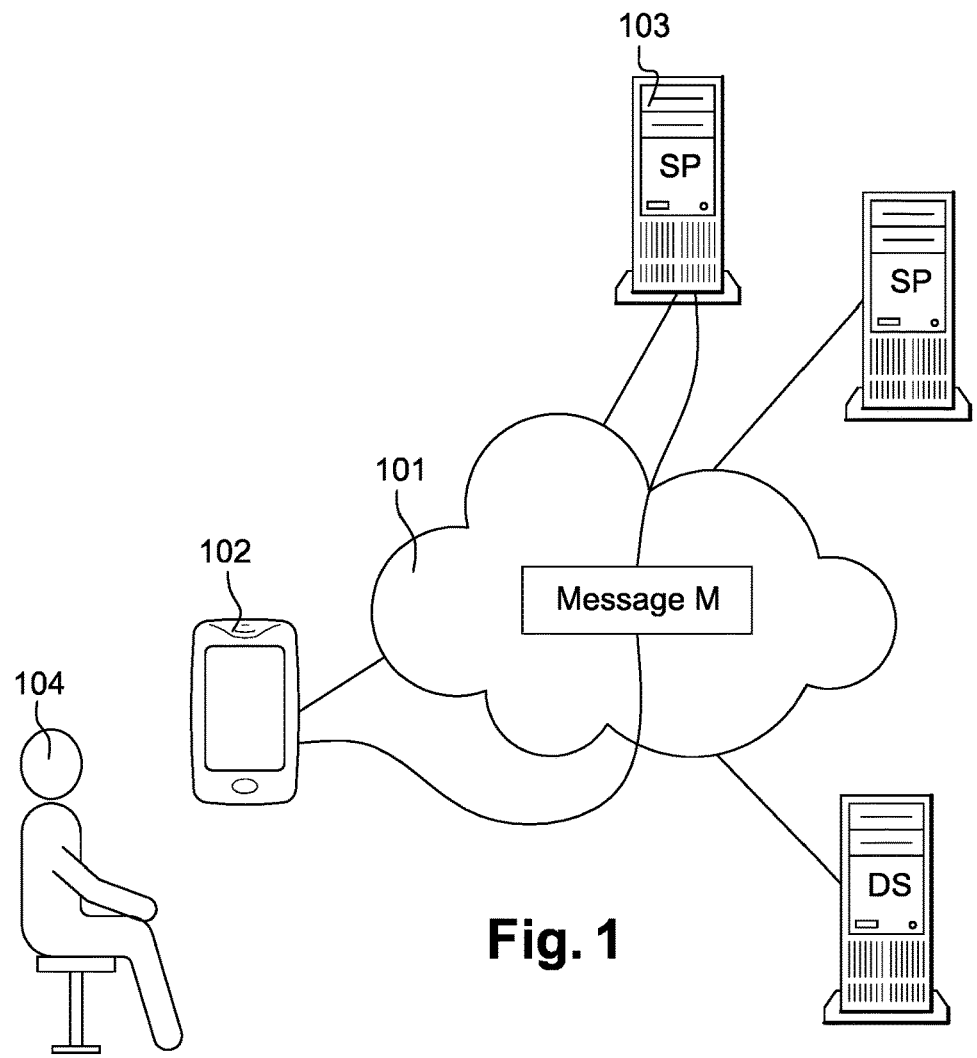
FIG. 1 is a schematic illustration of a system comprising a client device and one or more remote servers according to an embodiment of the present invention.

FIG. 1 is a schematic illustration of a network 101 connecting a cryptographic device 102 called client device, e.g., a mobile telephone, a tablet, or a personal computer, to one or more remote servers 103. The cryptographic device 102 is operated by a user 104 and interacts with one of the servers 103.

The server 103 is configured to generate a secure RSA key and send FHE encrypted secure RSA key parts to the client device. The client device performs then the cryptographic operations on behalf of the user 104, e.g., for deciphering RSA-enciphered messages or for signing messages. Such messages may include DRM protected content, such as a computer program or a music library.

Figure 2:
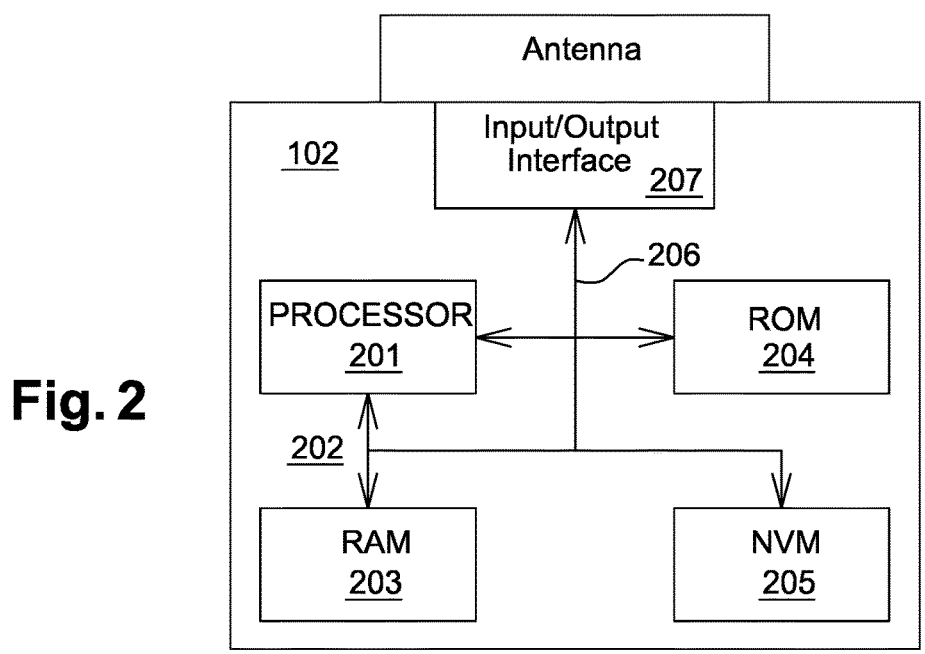
FIG. 2 is a schematic illustration of a client device according to an embodiment of the present invention.

FIG. 2 is a schematic illustration of a client device 102, for example, a mobile telephone, tablet, or personal computer. The client device 102 may include a processor 201 connected via a bus 202 to a random access memory (RAM)

203, a read-only memory (ROM) 204, and/or a non-volatile memory (NVM) 205. The client device 102 further includes a connector 206 connected to the processor and by which the client device 102 may be connected to an antenna. Such an antenna may be used to connect the client device 102 to various forms of wireless networks, e.g., wide-area networks, WiFi networks, or mobile telephony networks. Alternatively, the client device 102 may connect to networks via wired network connections such as Ethernet.

The ROM 204 and/or NVM 205 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. The programs 301 include operating system programs 302 as well as application programs loaded onto the client device 102. A sub-part of the memory, ROM and/or NVM, of the client device may store sensitive data 303 such as an RSA secret key. Such data may be stored under a FHE encrypted format as described here below.

The client device may also include input/output means 207 providing interfaces to the user of the client device, such as one or more screens, loudspeakers, a mouse, tactile surfaces, a keyboard etc. . . .

As illustrated in the FIG. 4, the server 103 includes at least a processor 401 for performing the operations needed for generating a secure RSA key, a memory 402 such as a RAM, a ROM and/or a NVM, and a wired or wireless network interface 403 for connecting to the network 101 and exchanging messages at least with the client device.

Figure 5:
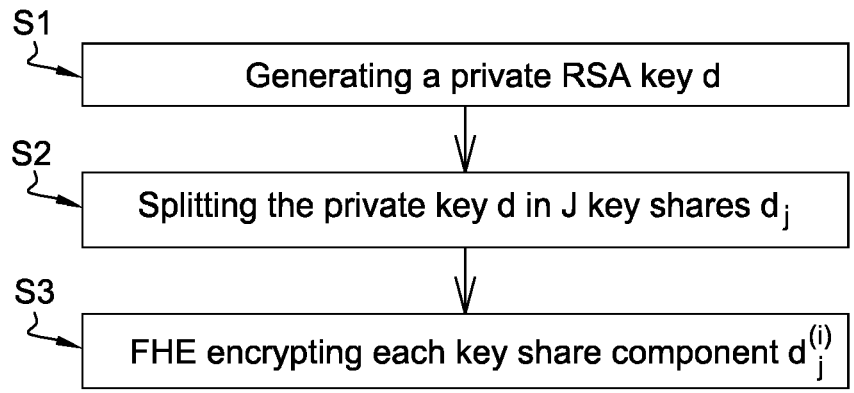
FIG. 5 illustrates schematically a method of generating a secure RSA key according to an embodiment of the present invention.

The following paragraphs describe the steps of a method of generating a secure RSA key performed by the server 103 according to a first aspect of the invention as depicted on FIG. 5.

In a first generation step S1, the processor of the server generates a private RSA key d and a RSA modulus N, both N and d being integers. N may be equal to 1024 or 2048 bits for example.

In a second generation step S2, to make more complex the extraction of the RSA private key d, the processor of the server splits the private key d in J key shares $d_j$ of binary length n, with $n = \log_2 N$, j in [1, J], J being an integer, and such that $d = d_1 + d_2 + \ldots + d_J \mod \text{phi}(N)$ where phi is Euler's totient function.

Each key share $d_j$ can be viewed as a concatenation of plural key share components $d_j^{(i)}$ of length b, where b is an integer inferior to n. Each key share $d_j$ is then equal to $(d_j^{(0)} \ldots d_j^{(i)} \ldots d_j^{(n/b-1)})$, where each key share component $d_j^{(i)}$ under its binary form is in $\{0 \ldots 2^b - 1\}$ and i is in $[0, n/b-1]$.

For example if J=2, d is split into two key shares $d_1$ and $d_2$ and each key share is composed of key share components of length b bits. Thus, $d = d_1 + d_2 \mod \text{phi}(N)$ with: $d_1 = (d_1^{(0)}, \ldots, d_1^{(i)}, \ldots, d_1^{(n/b-1)})$, where each $d_1^{(i)}$ is in $\{0, \ldots, 2^b - 1\}$ and $d_2 = (d_2^{(0)}, \ldots, d_2^{(i)}, \ldots, d_2^{(n/b-1)})$, where $d_2^{(i)}$ is in $\{0, \ldots, 2^b - 1\}$.

In the following steps of the method, each key share component will be treated separately. Thus, this splitting technique increases the difficulty for the attacker to retrieve all parts of the private key d.

For performing the following step, a predetermined integer number u of disjoint sets $\{S_1, S_2, \ldots, S_S, S_{S+1}, \ldots S_u\}$ is generated by the processor of the server. Each said set $S_S$ is a set of integer couples and such sets are generated such that: $U\{S_S\} = \{(i,j) \text{ such that } i \text{ in } [0, n/b-1], j \text{ in } [1, J]\}$. As a result, such sets define a partitioning of (i,j) integer couples and each integer couple (i,j) is included in one of the generated sets, and in one set only. Each said set $S_S$ among $\{S_1, \ldots, S_u\}$ is associated with a Fully Homomorphic Encryption (FHE) secret key $p_S$. In the following step these sets will be used to select a FHE encryption key for each of the key share components forming a part of the RSA private key d. In the rest of the description, key share components whose index couple (i,j) are included in a set $S_S$ are called "key share components associated with the set $S_S$".

The sets $\{S_1, \ldots, S_u\}$ may comprise at least a first set and a second set such that the FHE secret key associated with the first set is different from the FHE secret key associated with the second set. Alternatively, to increase the difficulty for the attacker, the FHE secret keys associated with each one of the sets $\{S_1, \ldots, S_u\}$ may all be different from one another.

We consider in the description below that all the sets $S_S$ are of the same size t. However, said sets may be also different sizes. If t=2n/b, then only one set is generated. However, this choice leads to the most expensive choice in terms of computing time and it is not suitable for now with the current state-of-the-art FHE schemes to be used in a mobile whitebox environment. More generically we consider in the following description that u·t=2n/b.

In a third generation step S3, the processor of the server encrypts, with a fully homomorphic encryption (FHE) algorithm, each key share component $d_j^{(i)}$ of the private key d by using a Fully Homomorphic Encryption secret key $p_S$. The FHE secret key used to encrypt a given key share component $d_j^{(i)}$ is the secret key $p_S$ associated with the set $S_S$ among $\{S_1, \ldots, S_u\}$ comprising the index couple (i,j). Thus, an encrypted key share components $ed_j^{(i)}$ is generated for each key share component of the private key d and generated encrypted key share components $ed_j^{(i)}$ form said secure RSA key.

In the following paragraphs, the encryption of x with a (fully/somewhat) homomorphic encryption scheme under a key $p_{HE}$ will be noted $HE[p_{HE}](x)$.

The fully homomorphic encryption algorithm may be derived from a DGHV (Dijik, Gentry, Halevi, Vaikuntanathan) Scheme (("*Fully Homomorphic Encryption over the Integer*", Dijk and al. [DGHV]). In such a scheme, a ciphertext c for a data m in $Z_N$, FHE encrypted with a FHE secret key p, is equal to $q \cdot p + N \cdot r + m$ where q is a random integer, r is a random integer and N is the RSA modulus such that $|p| > C_S(2 \log N + \log r)$ with $C_S$ the maximum number of elements of any set $S_S$ in $\{S_1, \ldots, S_U\}$, and such that the ciphertext c is deciphered by computing $m = (c \mod p) \mod N$. In [DGHV] the scheme is described for N=2.

Thus with DGHV Scheme, the encrypted key share component $ed_j^{(i)}$ of said secure RSA key is equal to $HE[p_S](d_j^{(i)}) = p_S \cdot q_1^{(i)} + N \cdot r_1^{(i)} + d_j^{(i)}$. The coefficient $q_1^{(i)}$ may be a large number randomly chosen for each new encryption and the coefficient $r_1^{(i)}$ may be a small number randomly chosen for each new encryption.

The FHE secret keys $p_S$ being sensitive since they allow to decrypt all the ciphertext values that are encrypted with $p_S$ keys, obfuscation techniques may be used to protect FHE secret keys $p_S$ (and the use thereof) in the code (i.e. for the decryption of FHE ciphertexts).

Other homomorphic schemes may be used such as BGV ("(Leveled) Fully Homomorphic Encryption without Bootstrapping", Brakerski and al.) or FV ("Somewhat Practical Fully Homomorphic Encryption", Fan and al.).

Optionally, in order to improve their performance, all homomorphic operations described in the following paragraphs can be performed modulo Q, where $Q = p \cdot q$ with p the FHE secret key and q a random number. Q may be public.

Figure 6:
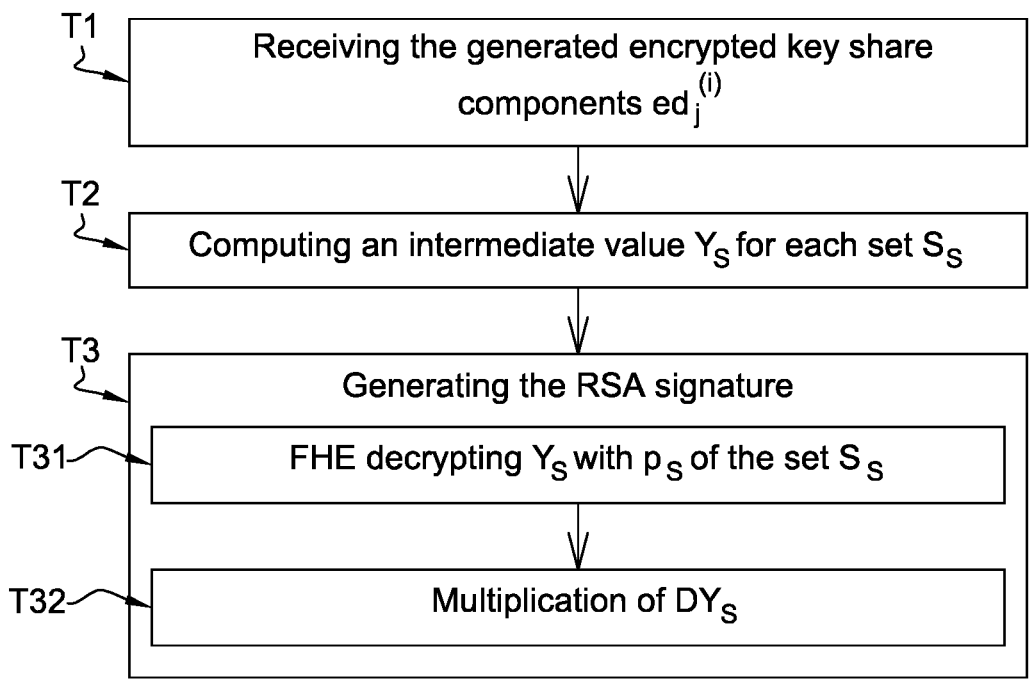
FIG. 6 illustrates schematically a method of secure generation of a RSA signature of a message m according to an embodiment of the present invention.

The following paragraphs describe the steps of a method of secure generation of a RSA signature of a message m according to a second aspect of the invention as depicted on FIG. 6. The client device performs the steps of this method using a secure RSA key generated according to the method according to the first aspect of the invention.

In a first signature step T1, the processor of the client device receives from the server, via its input/output interface 207 connecting it to a network such as the network 101, the generated encrypted key share components $ed_j^{(i)}$ with j in [1, J] and i in [0, n/b−1].

In a second signature step T2, the processor of the client device computes an intermediate value $Y_S$ for each set $S_S$ in $\{S_1, \ldots, S_u\}$. This intermediate value $Y_S$ is computed from said encrypted key share components $ed_j^{(i)}$ whose index couple (i,j) is comprised in $S_S$ and from said message m. This intermediate value is computed such that it is a part of the RSA signature of said message m, under FHE-encrypted form. Said otherwise, the client device computes separately for each set $S_S$ the part of the signature corresponding to the key share components $d_j^{(i)}$ associated said set $S_S$.

The order in which intermediate values $Y_S$ are computed for every sets $S_s$ in $\{S_1, \ldots, S_u\}$ may be random.

Finally, in a third signature step T3, the processor of the client device generates the RSA signature of said message m by combining said computed intermediate values $Y_S$ for all sets.

The computation of an intermediate value $Y_S$ for a set $S_S$ in $(S_1, \ldots, S_u)$ may comprise:
for all (i,j) in $S_S$, computing $z^{(i)} = h(m)^{(2^{\wedge}b)^{\wedge}i}$ mod N and computing $$y_j^{(i)} = \sum_{w=0}^{2^b-1} \left( \prod_{v=0, v \neq w}^{2^b-1} (ed_j^{(i)} - v)/(w-v) \right) z^{(i)^{\wedge}w}$$

calculating the product of $y_j^{(i)}$ for all (i,j) in the set $S_S$.

For example, when b=1, the computation of the intermediate value $Y_S$ for a set $S_S$ in $(S_1, \ldots, S_u)$ may comprise:
computing $z^{(i)} = h(m)^{2^{\wedge}i}$ mod N for i in [0 to n−1];
with $x^{(i)} = z^{(i)} - 1$ mod N for i in [0 to n−1], for all set $S_S$ in $\{S_1, \ldots, S_u\}$, for all (i,j) in $S_S$, computing $y_j^{(i)} = x^{(i)} \cdot ed_j^{(i)} + 1$. Such a $y_j^{(i)}$ is equal to $HE[p_S](h(m)^{2^{\wedge}i \cdot dj(i)})$;
for all set $S_S$ in $\{S_1, \ldots, S_u\}$, calculating the product of $y_j^{(i)}$ for all (i,j) in the set $S_S$.

For example, when b=2, the computation of the intermediate value $Y_S$ for a set $S_S$ in $\{S_1, \ldots, S_u\}$ comprises:
computing $z^{(i)} = h(m)^{4^{\wedge}i}$ mod N for i in [0 to n/2−1];
with $x^{(i)} = z^{(i)} - 1$ mod N for i in [0 to n/2−1]; for all set $S_S$ in $\{S_1, \ldots, S_u\}$, for all (i,j) in $S_S$, computing $y_j^{(i)} = (x^{(i)^{\wedge}}3)/6*(ed_j^{(i)^{\wedge}}3) + (x^{(i)^{\wedge}}2)(1-x^{(i)})/2*(ed_j^{(i)^{\wedge}}2) + (x^{(i)}(2x^{(i)^{\wedge}}2 - 3x^{(i)} + 6)/6*(ed_j^{(i)}) + 1)$. Such a $y_j^{(i)}$ value is equal to $HE[p_S](h(m)^{4^{\wedge}i \cdot d1(i)})$;
for all set $S_S$ in $\{S_1, \ldots, S_u\}$, calculating the product of $y_j^{(i)}$ for all (i,j) in the set $S_S$.

Optionally, the values $HE[p_S](d_j^{(i)^{\wedge}w}) = ed_j^{(i)^{\wedge}w}$, for each w in $[0; 2^{b-1}]$, resulting from the encryption with said FHE algorithm of the value of each key share component $d_j^{(i)}$ to the power w by using the FHE secret key $p_S$ of said set $S_S$ comprising the index couple (i,j) may be pre-computed and stored by the server, and then transmitted to the client device to compute said intermediate values.

Alternatively, the values $\Pi_{v=0, v \neq w}^{2^b-1}(ed_j^{(i)}-v)/(w-v)$ resulting from the encryption with said FHE algorithm of the $\Pi_{v=0, v \neq w}^{2^b-1}(d_j^{(i)}-v)/(w-v)$ value (equals to 1 if $d_j^{(i)} = w$ and equals to 0 else) by using the FHE secret key $p_S$ of said set $S_S$ comprising the index couple (i,j), may be pre-computed and stored by the server, and then transmitted to the client device to compute said intermediate values.

Such a precomputation by the server of these values decreases the cost of computing a signature for the client device, but increase the occupied memory space in the memory of the client device.

Alternatively, these values $ed_j^{(i)^{\wedge}w}$ or $\Pi_{v=0, v \neq w}^{2^b-1}(ed_j^{(i)} - v)/(w-v)$ may be recomputed on-the-fly, depending on the targeted performance (either computation time or stored key size).

Moreover the choice b=2 can help to protect against certain fault attacks compared to the choice b=1.

Optionally, during or prior to the first or second signature step, the processor of the client device may compute 2n/b values $a_j^{(i)}$ such that $\Pi_{i,j} a_j^{(i)} = 1$ mod N. Then during the second signature step, each intermediate value computed for a set $S_S$ may be masked before FHE encryption by the $a_j^{(i)}$ values whose index couple (i,j) belongs to said set. For example when b=1, the client device may compute for all set $S_S$ in $\{S_1, \ldots, S_u\}$, for all (i,j) in $S_S$, $y_j^{(i)} = a_j^{(i)}(x^{(i)} \cdot ed_j^{(i)} + 1) = HE[p_S](a_j^{(i)} h(m)^{2^{\wedge}i \cdot dj(i)})$ instead of computing $HE[p_S] (a_j^{(i)} h(m)^{2^{\wedge} \cdot dj(i)})$. When all intermediate values are combined, $a_j^{(i)}$ values are multiplied all together and disappear. It makes more difficult for the attacker to recover key share components by performing a safe error attack by simply removing a value $y_j^{(i)}$ and then by checking if the result has changed or not.

In the third signature step T3, intermediate values $Y_S$ are combined in order to retrieve the signature of a message m. This third step T3 may be performed differently depending on the number of elements t in each set S. When the number of elements t in each set S is big enough, e.g. t=256 or t=512 the intermediate values $Y_1, \ldots, Y_S$ may be decrypted and then the results may be multiplied with each other to get the signature of a message m. Indeed, there is little risk then that an attacker could deduce from a decrypted intermediate value, under the form $$h(m)^{\Sigma_{t(i,j) values} 2^i d_j^{(i)}},$$

the key share components $d_j^{(i)}$ associated with the set for which this intermediate value was computed.

When the number of elements t in each set S is small, e.g. t=4 or t=8, there is a risk that an attacker can retrieve the key share components $d_j^{(i)}$ from decrypted intermediate values, and then retrieve the whole private key d. In that case intermediate values may be combined under homomorphically encrypted form until getting the equivalent of an intermediate value computed for a large enough number of key share components. Since encrypted key share components associated with different sets may be FHE-encrypted using different FHE secret keys, when decryption is needed for intermediate values combination, sensitive intermediate values may be masked before decryption.

More precisely, when the number of elements t in each set S is sufficiently e.g. t=256 or t=512, the generation of the RSA signature comprises the following steps.

In a fourth signature step T31, for each intermediate value $Y_S$ computed for each set $S_S$ in $\{S_1, \ldots, S_u\}$, the processor of the client device performs a decryption of said computed intermediate value $Y_S$ by using the FHE secret key $p_S$ of the set $S_S$, In a fifth signature step T32, the processor of the client device performs the multiplication of said decrypted intermediate values all together.

Thus with DGHV scheme, the generation of the RSA signature comprises:
- in the fourth signature step T31, computing for each set $S_S$ in $\{S_1, \ldots, S_u\}$ the decrypted intermediate value $DY_S=Y_S$ modulo $p_S$ modulo N,
- then in the fifth signature step T32, computing the signature $h(m)^d$ mod N as the product, of all $DY_S$ modulo N.

As the decrypted intermediate values $DY_S$ computing step uses FHE secret keys of the sets $S_S$ and since such secret keys are very sensitive, obfuscation techniques may be used to protect the secret keys $p_S$.

When the number of elements t in each set S is small, e.g. t=4 or t=8, there is a risk that an attacker can retrieve the key share components $d_j^{(i)}$ from decrypted intermediate values $DY_S$, and then retrieve the whole private key d. To solve this problem, the intermediate values are combined under homomorphically encrypted form. Each intermediate value is a FHE encrypted value, encrypted with the FHE secret key associated with the set for which the intermediate value was calculated. Since the FHE secret keys associated with different sets $S_S$ may be different, intermediate values must be FHE-decrypted before being combined. In order to avoid calculating decrypted intermediate values that could be read by an attacker, when decryption is needed for intermediate computing, sensitive values are masked before decryption. In order to combine two intermediate values, instead of decrypt both intermediate values, they may be encrypted using the same FHE secret key. For that purpose, a key switching may be executed as described below.

In order to combine computed intermediate values, the generation of the RSA signature T3 may comprise a combination of a first intermediate value $Y_S$ for a first set $S_S$ and a second intermediate value $Y_T$ for a second set $S_T$, with $S_S$ and $S_T$ in $\{S_1, \ldots, S_u\}$, said combination comprising successively:
- a. a prior masking of the first intermediate value $Y_S$ with a mask being FHE-encrypted with the FHE secret key $p_S$ of the first set $S_S$,
- b. a FHE-decryption, with the FHE secret key $p_S$ of the first set $S_S$, of said masked first intermediate value,
- c. a simultaneous unmasking and FHE-encryption with the FHE secret key $p_T$ of the second set $S_T$, of the decrypted masked first intermediate value,
- d. a multiplication of the result of step c. with the second intermediate value $Y_T$.

At the end of step c, the intermediate value computed for the set $S_S$ is no longer FHE-encrypted with the FHE secret key $p_S$ associated with the set $S_S$ but with the FHE secret key $p_T$ associated with the set $S_T$ and can therefore be easily combined with the intermediate value $Y_T$ computed for the set $S_T$ and also FHE-encrypted with the secret key $p_T$ associated with the set $S_T$.

The mask used in step a/ may be precomputed before the beginning of the signature process and stored by the client device under a FHE-encrypted form. The method may use an additive masking or a multiplicative masking. The inverse of the mask, that can be used in step c for unmasking in case of multiplicative masking, or the opposite of the mask that can be used in step c for unmasking in case of additive masking, may also be precomputed and stored under FHE-encrypted form.

Optionally, several masks may be precomputed for each set and the client device may for each set, at the beginning of step a/, chose among said precomputed masks one mask to be used for masking the intermediate value computed for said set.

Optionally the encrypted masks could be randomized at each execution.

In the following paragraphs, an example of implementation of such steps for combining two intermediate values $Y_S$ and $Y_T$ computed for sets $S_S$ and $S_T$ is given for DGHV scheme.

The FHE encryption $ek_S$ of a random value $k_S$ using the secret key $p_S$ associated with the set $S_S$ may be pre-computed:

$ek_S = HE[p_S](k_S) = p_S \cdot q_S + N \cdot r_S + k_S$ with $q_S$ a large random number and $r_S$ a small random number.

The FHE encryption $einvk_S$ of the inverse or opposite $invk_S$ of the random value $k_S$ using the secret key $p_T$ associated with the set $S_T$ may be also pre-computed:

$Einvk_S = HE[p_T](invk_S) = p_T \cdot q'_S + N \cdot r'_S + invk_S$ with $invk_S = -k_S$ mod N in case of additive masking or, $invk_S = k_S^{-1}$ mod N in case of multiplicative masking.

Then a key switching may be performed from $S_S$ to $S_T$:

In step a, the intermediate value $Y_S$ is masked by computing $z_S = Y_S * ek_S$ in case of multiplicative masking or $z_S = Y_S + ek_S$ in case of additive masking. It is equal to $HE[p_S]$ of $$\left[h(m)^{\Sigma_{S_S} 2^i d_j^{(i)}}\right]$$

masked by $k_S$].

In step b, the result may be decrypted, to get the masked decrypted intermediate value for the set $S_S$:

$m_S = z_S$ mod $p_S$ $$\mathrm{mod} N = k_S * h(m)^{\Sigma_{S_S} 2^i d_j^{(i)}}$$

mod N in case of multiplicative masking or $m_S = z_S$ mod $p_S$ $$\mathrm{mod} N = k_S + h(m)^{\Sigma_{S_S} 2^i d_j^{(i)}}$$

mod N in case of additive masking.

In step c the result $m_S$ can be unmasked and at the same time homomorphically encrypted with $p_T$ in order to ensure its secrecy $$w_S = m_S * einvk_S = k_S * h(m)^{\Sigma_{S_S} 2^i d_j^{(i)}} * HE[p_T](invk_S) =$$
$$HE[p_T]\left(h(m)^{\Sigma_{S_S} 2^i d_j^{(i)}}\right) \text{ in case of multiplicative masking or}$$
$$w_S = m_S + einvk_S = k_S + h(m)^{\Sigma_{S_S} 2^i d_j^{(i)}} * HE[p_T](invk_S) =$$
$$HE[p_T]\left(h(m)^{\Sigma_{S_S} 2^i d_j^{(i)}}\right) \text{ in case of additive masking.}$$

In step d, $w_S$ corresponding to the first intermediate value $Y_S$ but encrypted with the FHE secret key $p_T$ associated with $S_T$ may be combined with the intermediate value $Y_T$ by computing $$Y'_T = Y_T * w_S = HE[p_2]\left(h(m)^{\Sigma_{S_S} US_T 2^i d_j^{(i)}}\right).$$

Even after combining two intermediate values, the number of key share components taken into account in the combined intermediate value at the end of step d/ may be too small to enable a safe FHE decryption of it. An iterative process may executed in order to combine together multiple intermediate values until the combination result can be FHE decrypted without much security risk.

More precisely, the generation of the RSA signature may comprise a combination of a first intermediate value $Y_S$ FHE-encrypted with a first FHE secret key $p_S$ associated with a first set $S_S$, with a second intermediate value $Y_T$ FHE-encrypted with a second FHE secret key $p_T$ associated with a second set $S_T$, wherein $S_S$ and $S_T$ are the union of one or more sets in $\{S_1, \ldots, S_u\}$.

A random value $k_S$ may have been FHE-encrypted with the first FHE secret key $p_S$ to generate a FHE-encrypted mask $ek_S$ for the first set $S_S$, and the inverse or opposite $invk_S$ of the random value $k_S$ may have been FHE encrypted with the second FHE secret key $p_T$ of the second set $S_T$ to generate a FHE-encrypted inverse mask $einvk_S$ for the first set $S_S$.

Said combination of $Y_S$ and $Y_T$ may comprise if the size of the first set $S_S$ is below a predetermined value, performing a key switching between said first set $S_S$ and said second set $S_T$ comprising:

masking the first intermediate value $Y_S$ with said generated mask:

$$z_S = Y_S * ek_S \text{ or } z_S = Y_S + ek_S;$$

FHE-decrypting said masked first intermediate value $z_S$ with the first FHE secret key $p_S$ to obtain a decrypted masked first intermediate value $m_S$;

simultaneously unmasking and FHE-encrypting with the second FHE secret key $p_T$ the decrypted masked first intermediate value $m_S$ by multiplying or summing up said decrypted masked first intermediate value $m_S$ with said FHE-encrypted inverse mask $einvk_S$ for the first set $S_S$, to obtain a third intermediate value $w_S = m_S * einvk_S$ or $w_S = m_S + einvk_S$;

multiplying the second intermediate value $Y_T$ with the third intermediate value $w_S$ for obtaining a fourth intermediate value $Y_{S'}$ for the set $S_{S'}$ union of sets $S_S$ and $S_T$: $Y_{S'} = Y_T * W_S$;

Then, if the size of the set $S_{S'}$ union of said first set $S_S$ and said second set $S_T$ is superior to said predetermined value, FHE decrypting said fourth intermediate value $Y_{S'}$ with the second FHE secret key $p_T$ of the second set $S_T$;

Else the same steps may be performed again using the fourth intermediate value $Y_{S'}$ as first intermediate value for the union set $S_{S'}$ as first set, with the second FHE secret key $p_T$ as first FHE secret key, and using a fifth intermediate value $Y_v$ as second intermediate value for a third set $S_v$ as second set, wherein $S_v$ is the union of one or more sets in $\{S_1, \ldots, S_U\}$ not already included in the union set $S_{S'}$.

In order to be able to precompute the FHE-encrypted form of the inverse or opposite of the random number used as a mask, the order in which intermediate values are combined may be predefined. The client device may then compute for each $S_S$ set in $\{S_1, \ldots, S_U\}$ a random value encrypted with the secret key associated with the set $S_S$ and its inverse or opposite value encrypted with the secret key associated with the next set after the set $S_S$ following the predefined order.

Once the size of the union of multiple sets $S_1 \cup \ldots \cup S_m$ is sufficiently big, e.g. the key share components related to $S_1 \cup \ldots \cup S_m$ amount to 256 bits or 512 bits, the combined intermediate value may be decrypted and combined with other decrypted values as described above in the case where the number of elements t in each set S is sufficiently big.

In the embodiment described here above, the partitioning of (i,j) couples into the sets $\{S_1, \ldots, S_u\}$, defining which FHE secret key should be used to FHE encrypt each key share component, is chosen by the server and used by the client device. Such a solution is efficient but has the major drawback of being static. Until the server defines new sets, the client device will use in subsequent signature generations the same pattern: encrypted key share components grouping in sets will be the same and steps performing calculations on all the key share components of a given set will keep performing calculations on the same key share components one signature after the other. An attacker may take advantage of such a pattern and retrieve key share components after multiple attacks on several signature generations.

In another embodiment, the client device may disregard the sets generated by the server and generate his own sets, possibly for each signature generation. However, in such an embodiment, the server, when generating the secure RSA key, does not know which key share components will be gathered in a same set on the client side. Such key share components associated with a given set are to be combined together when computing the intermediate value for this set, as described in the second signature step T2 here above. In order to do so, and since such a combination is performed under FHE encrypted form, encrypted key share components generated by the server in the third generation step S3 described here above shall all be encrypted with a single FHE secret key. As a result, in this embodiment, FHE secret keys $p_S$ of sets $S_S$ shall all be identical.

Figure 7:
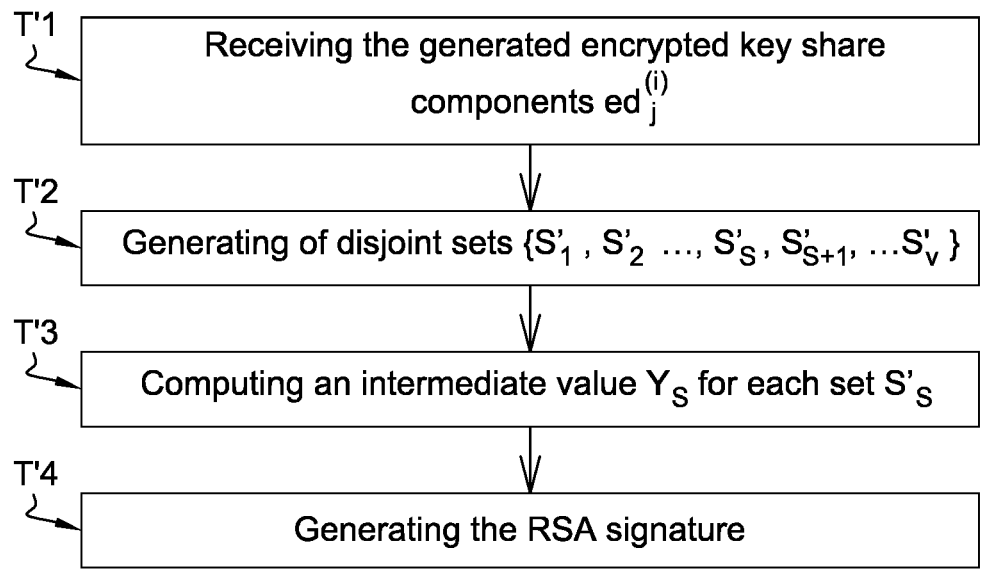
FIG. 7 illustrates schematically a method of secure generation of a RSA signature of a message m according to another embodiment of the present invention.

In this embodiment the client device may generate sets $S'_S$ and compute intermediate values $Y_S$ for each set $S'_S$. As depicted on FIG. 7, the method of secure generation of a RSA signature of a message m by the client device according to a third aspect of the invention is then a little different from the method of secure generation according to the second aspect of the invention. Prior to applying this method, the server generates a secure RSA key by applying the method according to the first aspect and wherein FHE secret keys $p_S$ of sets $S_S$ are all identical.

In a first alternative signature step T'1, the processor of the client device receives from the server, via its antenna, the generated encrypted key share components $ed_j^{(i)}$ with j in [1, J] and i in [0, n/b−1].

In a second alternative signature step T'2, the processor of the client device generates a predetermined integer number v of disjoint sets $\{S'_1, S'_2, \ldots, S'_S, S'_{S+1}, \ldots, S'_v\}$ such that: $\cup\{S'_S\} = \{(i,j) \text{ such that i in } [0, n/b-1], j \text{ in } [1, J]\}$. Each said set $S'_S$ among $\{S'_1, \ldots, S'_v\}$ is associated with the Fully Homomorphic Encryption (FHE) secret key $p_S$ used by the server to encrypt the key share components.

In a third alternative signature step T'3, the processor of the client device computes an intermediate value $Y_S$ for each set $S'_S$ in $\{S'_1, \ldots, S'_v\}$ from said encrypted key share components $ed_j^{(i)}$ whose index couple (i,j) is comprised in $S'_S$ and from said message m, such that said computed intermediate value is a part of the RSA signature of said message m, under FHE-encrypted form.

Finally, in a fourth alternative signature step T'4, the processor of the client device generates the RSA signature of said message m by combining said computed intermediate values for all sets S'$_S$.

The detailed implementation of the third and fourth alternative signature steps T'3 and T'4 may be respectively identical to the implementation of the second and third signature steps T2 and T3 described above, except that sets {S'$_1$, ..., S'$_v$} are used instead of sets {S$_1$, ..., S$_U$}.

In an embodiment, the generation of said disjoint sets {S'$_1$, ..., S'$_v$} may be performed depending on said message m.

Figure 8:
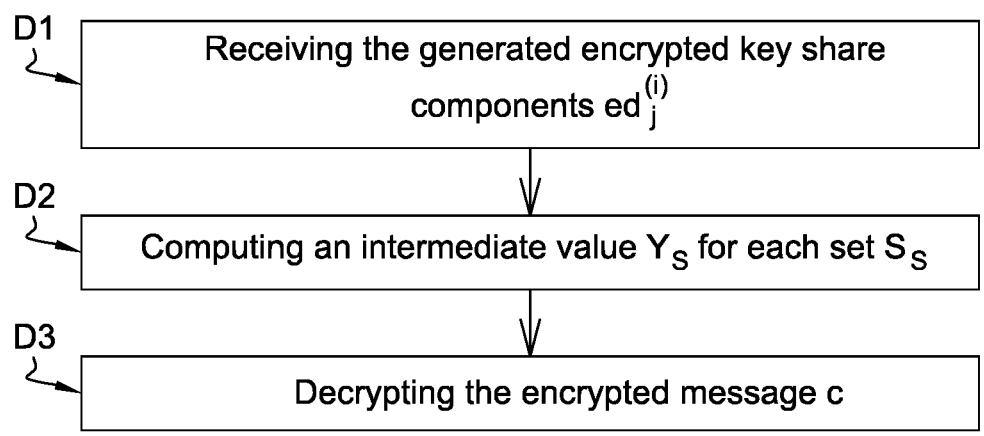
FIG. 8 illustrates schematically a method of secure RSA decryption of an RSA encrypted message according to an embodiment of the present invention.

The following paragraphs describe the steps of a method of secure RSA decryption by the client device of an RSA encrypted message c according to a fourth aspect of the invention as depicted on FIG. 8. The message c has been encrypted with a public RSA key forming a key pair with a secure private RSA key generated according to the method according to the first aspect of the invention.

In a first decryption step D1, the processor of the client device receives from the server, via its antenna, the generated encrypted key share components ed$_j^{(i)}$ with j in [1, J] and i in [0, n/b−1].

In a second decryption step D2, the processor of the client device computes an intermediate value Y$_S$ for each set S$_S$ in {S$_1$, ..., S$_u$} from said encrypted key share components ed$_j^{(i)}$ whose index couple (i,j) is comprised in S$_S$ and from said encrypted message c, such that said computed intermediate value is a part of the RSA decrypted message m, under FHE-encrypted form.

In a third decryption step D3, the processor of the client device decrypts the RSA encrypted message c by combining said computed intermediate values for all sets.

The implementation of each step may be identical to the implementation of the corresponding signature step described above, except that computations applied to the message m in signature steps are applied to the RSA encrypted message c.

The invention claimed is:

1. A method of secure Rivest-Shamir-Adelson (RSA) decryption by a client device of an RSA encrypted message c encrypted with a public RSA key forming a key pair with a secure private RSA key, comprising the steps of:
    receiving from a server J generated encrypted key share components ed$_j^{(i)}$ with j in [1, J] and i in [0, n/b−1] whereby i and j form an index couple (i,j), the encrypted key share components ed$_j^{(i)}$ computed by the server by:
    generating a private RSA key d and a RSA modulus integer N, where N and d are integers;
    splitting the private key d in J key shares dj of length n, with n=log$_2$ N, j in [1, J], J being an integer, and such that d=d$_1$+d$_2$+ ... +d$_J$ mod phi(N), where each key share dj is equal to (d$_j^{(0)}$ ... d$_j^{(i)}$ ... d$_j^{(n/b-1)}$) with each key share component d$_j^{(i)}$ in {0 ... 2^b−1} and i in [0, n/b−1], b being an integer inferior to n and phi the Euler's totient function;
    encrypting with a fully homomorphic encryption (FHE) algorithm each key share component d$_j^{(i)}$ of the private RSA key d by using a Fully Homomorphic Encryption secret key p$_s$ associated with a set S$_s$ comprising the index couple (i,j), to generate each encrypted key share component ed$_j^{(i)}$ with j in [1, J] and i in [0, n/b−1] whereby i and j form an index couple (i,j) of said secure RSA key,
    said set S$_s$ being a set of integer couples, among a predetermined integer number u of disjoint sets {S$_1$, S$_2$ ..., S$_u$} generated such that: U{S$_s$}={(i,j) such that i in [0, n/b−1], j in [1, J]} and each said set among {S$_1$, ..., S$_u$} being associated with a Fully Homomorphic Encryption (FHE) secret key;
    computing an intermediate value Y$_S$ for each set S$_S$ in {S$_1$, ..., S$_u$} from said encrypted key share components ed$_j^{(i)}$ whose index couple (i,j) is comprised in S$_S$ and from said encrypted message c, such that said computed intermediate value is a part of the RSA decrypted message m, under FHE-encrypted form;
    decrypting the encrypted message c by combining said computed intermediate values for all sets S$_s$ in {S$_1$, ..., S$_u$}.

2. The method of claim 1 wherein said FHE secret keys for each set S$_S$ in {S$_1$, ..., S$_u$} are all identical.

3. The method of claim 1 wherein {S$_1$, ..., S$_u$} comprises at least a first set and a second set such that the FHE secret key associated with the first set is different from the FHE secret key associated with the second set.

4. The method of claim 1 wherein the fully FHE algorithm is a Dijik, Gentry, Halevi, Vaikuntanathan (DGHV) Scheme such that a RSA encrypted message c for a data m in ZN, FHE encrypted with a FHE secret key p, is equal to q·p+N·r+m where q is a random integer, r is a random integer and N is the RSA modulus such that |p|>C$_S$(2 log N+log r) with C$_S$ the maximum number of elements of any set S$_S$ in {S$_1$, ..., S$_U$}, and such that the RSA encrypted message c is deciphered by computing m=(c mod p) mod N.

5. The method of claim 1 wherein an order in which intermediate values Y$_S$ are computed for each set S$_s$ in {S$_1$, ..., S$_u$} is random.

6. A client device adapted to securely decrypt an Rivest-Shamir-Adelson (RSA) encrypted message c encrypted with a public RSA key forming a key pair with a secure private RSA key, comprising:
    a memory (201, 203, 204);
    a processor (201), and
    an interface (207) to receive J key share components ed$_j^{(i)}$ with j in [1, J] and i in [0, n/b−1] whereby i and j form an index couple (i,j), the encrypted key share components ed$_j^{(i)}$ computed by a server by:
    generating a private RSA key d and a RSA modulus integer N, where N and d are integers;
    splitting the private key d in J key shares d$_j$ of length n, with n=log$_2$ N, j in [1, J], J being an integer, and such that d=d$_1$+d$_2$+ ... +d$_J$ mod phi(N), where each key share d$_j$ is equal to (d$_j^{(0)}$ ... d$_j^{(i)}$ ... d$_j^{(n/b-1)}$) with each key share component d$_j^{(i)}$ in {0 ... 2^b−1} and i in [0, n/b−1], b being an integer inferior to n and phi the Euler's totient function;
    encrypting with a fully homomorphic encryption (FHE) algorithm each key share component d$_j^{(i)}$ of the private RSA key d by using a Fully Homomorphic Encryption secret key p$_s$ associated with a set S$_s$ comprising the index couple (i,j), to generate each encrypted key share component ed$_j^{(i)}$ with j in [1, J] and i in [0, n/b−1] whereby i and i form an index couple (i,j) of said secure RSA key,
    said set S$_s$ being a set of integer couples, among a predetermined integer number u of disjoint sets {S$_1$, S$_2$ ..., S$_s$, S$_{s+1}$, ... S$_u$} generated such that: U{S$_S$}={(i,j) such that i in [0, n/b−1], j in [1, J]} and each said set among {S$_1$, ..., S$_u$} being associated with a Fully Homomorphic Encryption (FHE) secret key;

the memory comprising instructions to cause the processor to:

compute an intermediate value $Y_S$ for each set $S_S$ in $\{S_1, \ldots, S_u\}$ from said encrypted key share components $ed_j^{(i)}$ whose index couple (i,j) is comprised in $S_s$ and from said encrypted message c, such that said computed intermediate value is a part of the RSA decrypted message m, under FHE-encrypted form;

decrypt the encrypted message c by combining said computed intermediate values for all sets $S_s$ in $\{S_1, \ldots, S_u\}$.

7. The client device of claim 6 wherein said FHE secret keys for each set $S_s$ in $\{S_1, \ldots, S_u\}$ are all identical.

8. The client device of claim 6 wherein $\{S_1, \ldots, S_u\}$ comprises at least a first set and a second set such that the FHE secret key associated with the first set is different from the FHE secret key associated with the second set.

9. The client device of claim 6 wherein the FHE algorithm is a DGHV Dijik, Gentry, Halevi, Vaikuntanathan (DGHV) Scheme such that a RSA encrypted message c for a data m in ZN, FHE encrypted with a FHE secret key p, is equal to q·p+N·r+m where q is a random integer, r is a random integer and N is the RSA modulus such that $|p| > C_S(2 \log N + \log r)$ with Cs the maximum number of elements of any set $S_S$ in $\{S_1, \ldots, S_U\}$, and such that the RSA encrypted message c is deciphered by computing m=(c mod p) mod N;

The client device of claim 6 wherein the order in which intermediate values $Y_S$ are computed for every sets $S_s$ in $\{S_1, \ldots, S_u\}$ is random.

* * * * *